July 25, 1967  G. D. NESHEIM  3,332,640
SPACE STATION
Filed April 1, 1963
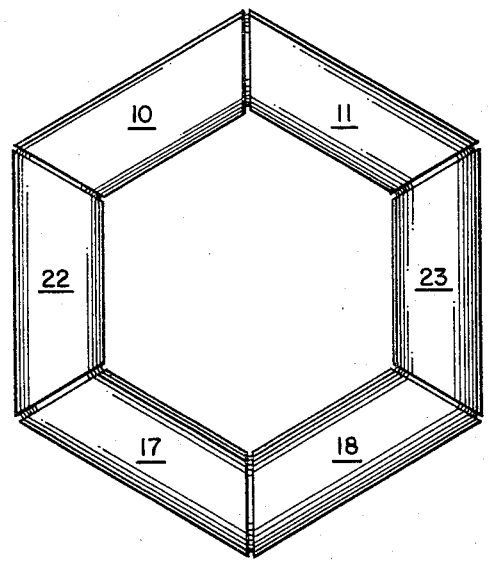
FIG.-3
FIG.-1
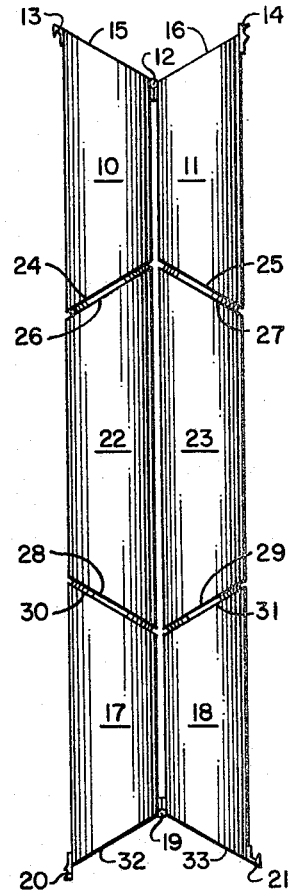
FIG.-2
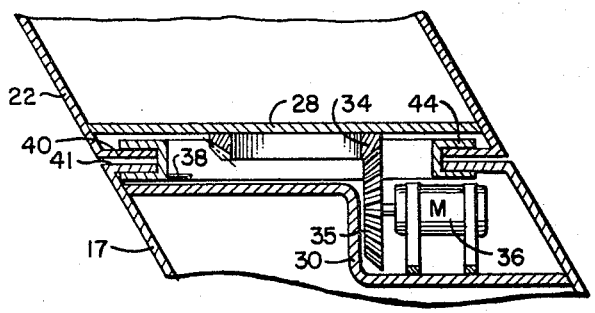
FIG.-4
FIG.-5
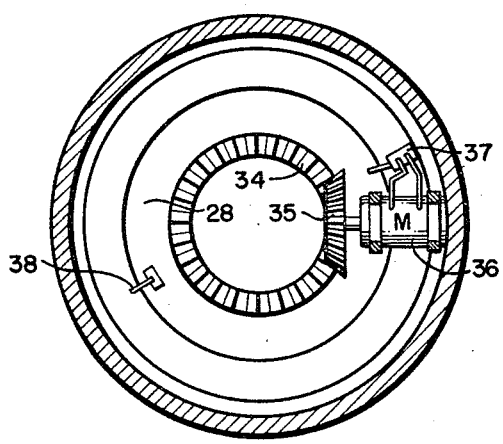
INVENTOR
GLENN D. NESHEIM
BY
ATTORNEY
AGENT

United States Patent Office 3,332,640
Patented July 25, 1967

3,332,640
SPACE STATION
Glenn D. Nesheim, Balboa Island, Calif., assignor to Aerojet-General Corporation, Azusa, Calif., a corporation of Ohio
Filed Apr. 1, 1963, Ser. No. 269,329
6 Claims. (Cl. 244—1)

The present invention relates in general to space vehicles and more particularly to preformed space stations.

Space stations of any considerable size cannot be sent into space in assembled form within foreseeable space effort capabilities. While assembling such a station in space is an obvious alternative, such assembly presents numerous difficulties among which are fuel requirements, the necessity for suitable control mechanisms for directing both personnel and component parts, and personnel themselves, all of which would render such an effort costly and onerous. The present invention avoids the difficulties encountered in assembling a station in space by providing a partly prejoined structure which may be sent into space in collapsed form and which structure may be sent or launched into space within present or foreseeable space effort capabilities.

Accordingly it is an object of the present invention to provide a space station sufficiently preassembled so as to reduce to a minimum the effort needed to complete the assembly in space.

It is another object of this invention to provide a substantially preassembled space station which may be launched in compact form and propelled into space by means presently available or reasonably to be expected within the art.

It is a further object of the present invention to provide a substantially preassembled space station which may be launched into space in compact form and whose major structural members provide usable storage, working or living space in the assembled station.

It is a still further object of the present invention to provide a substantially preassembled space station which presents a minimum of aerodynamic drag during launching and transit into space, yet which comprises interconnected components that may be either manually or automatically rearranged in space.

Other objects and many of the attendant advantages of this invention will be readily appreciated as the same becomes better understood by reference to the following detailed description when considered in connection with the accompanying drawings, wherein:

FIG. 1 is a side elevation of the sections of a space station in collapsed condition.

FIG. 2 is an end elevation of the space station in collapsed condition as shown in FIG. 1.

FIG. 3 is a plan view of the space station shown in FIGS. 1 and 2 in repositioned form.

FIG. 4 is a fragmentary longitudinal cross-sectional view of adjacent sections of the space station shown in FIGS. 1 and 2 and illustrating a means for repositioning the sections in space.

FIG. 5 is a transverse cross-sectional view taken through a connection between two sections of the space station.

The space station of the present invention concerns a partly preconnected structure which on launching is clustered closely about the rocket carrier. On reaching space it is unfolded, extended and joined together to form a toroidal structure, the forming of such structure being accomplished without having to bring together in space the component portions thereof. The vehicle carrying the preassembled station into space is separated from the station during flight.

The illustrations and related descriptions refer to a space station comprising two series of three elongated tubular sections each. However, it is noted that there may be more than two series of tubular sections. Also, each series of sections may comprise a different number of sections than the three sections shown in the illustrated embodiment within the spirit of this invention.

Referring to FIGS. 1 and 2, a pair of tubular sections 10 and 11 are shown joined together at their upper ends by pivot means in the form of a hinge 12. The sections are provided with automatically engaging locking elements 13 and 14 whose function is to maintain sections 10 and 11 with their ends 15 and 16 in abutment in the erected mode of the space station.

The space station of the present invention may be and is intended for use in storing supplies as well as to provide living spaces. Thus, the tubular sections are necessarily of considerable size and length, the ends of each section being cut inwardly at an angle of 60° for sections in the six sided space station embodiment described herein.

The lower pair of sections 17 and 18 are joined by pivot means in the form of a hinge 19 and are also provided with automatically engaging locking elements 20 and 21, to maintain end walls 32 and 33 in abutment when the space station is in the erected mode.

Center sections 22 and 23 are rotatably connected between their respective outer sections 10, 17 and 11, 18 such that the two series of sections 10, 22, 17 and 11, 23, 18 may be arranged to present outer surfaces lying in parallel relation with the longitudinal axes of the sections 10, 22, 17 and 11, 23, 18 comprising the two series being contiguous so as to lie along respective straight parallel lines, which is the position of the space station shown in FIGS. 1 and 2. FIGS. 1 and 2 illustrate the launching position of the space station. Upon rotating the center sections 22, 23 through 180° from the launching position of the space station as shown in FIGS. 1 and 2 in a manner to be presently described, the sections comprising the space station will assume the position shown in FIG. 3 in which the space station defines a hexagonal rim and adjacent sections of the space station are arranged at an angle of 120° with respect to each other.

In the positions of the sections as shown in FIGS. 1 and 2, the periphery of the space station sections will be aligned and form in effect continuous longitudinal members having adequate strength in the longitudinal direction to resist forces due to the acceleration of the launch vehicle carrying the space station into position.

Airtight bulkheads may be installed at desired interfaces, such as ends 15, 16, 32 and 33, or all interfaces may be made airtight by providing airtight enclosures for rotary power means at selected interfaces.

Center sections 22 and 23 are maintained in operative rotatable engagement with their respective outer sections 10, 17 and 11, 18, center sections 22 and 23 being rotated with respect to their adjoining outer sections by drive means such as shown in FIG. 4, which may include intermeshing gears in the form of a rack 34 on bulkhead 28 and a rotary pinion 35 driven by motive means 36 attached to bulkhead 30. Relative motion between sections may be accomplished by use of electrical energy, compressed gas, miniature jet or other appropriate power means. The motive means may be enclosed thus maintaining the airtight integrity of all bulkheads. Control means for stopping relative movement at a desired angular position may be any conventional circuit breaking means such as switch 37 and stop 38.

FIG. 4 shows one means for connecting a center section to an adjacent outer section in the same series of sections to provide for relative rotation therebetween. Sections 22 and 17 may, for example, have inwardly turned flanges 40 and 41, respectively, at their extremities, with the flanges enclosed in sliding relationships within circular channel member 44. Bulkheads 28 and 30 enclose the sliding joint as well as the drive means and the control means therefor. Motive means 36 may be secured to bulkhead 30 as shown or may be secured to a longitudinal wall of the section and in a different manner than shown within the concept of the invention. The motive means may also be positioned on any of the pairs of relatively rotatable interfaces of adjoining tubular sections within the scope of the invention.

The space station of the present invention may be oriented in a configuration aerodynamically compatible for exiting the earth's atmosphere by providing assembled sections which have substantially continuous straight outer surfaces when positioned as shown in FIGS. 1 and 2. The sections remain connected during repositioning in space thereby avoiding a requirement for fabrication which could involve a costly sacrifice of weight and space for necessary additional equipment and personnel.

In the embodiment shown, the sections are elliptical in transverse cross-section perpendicular to their respective longitudinal axes, but have circular cross-sections along respective planes angularly inclined to their longitudinal axes at their end faces where relative rotation of one end face with respect to another end face of adjoining sections occurs. By having circular end faces on the sections, it is possible to alter the form of the assembly from the launching mode shown in FIG. 1 to the space station mode shown in FIG. 3 without any exterior changes, additions or fabricating steps. The eccentricity of the elliptical transverse cross-section of the tubular sections shown is such that a plane angled at 60° to the plane of the longitudinal axis of a tubular section will define a circular cross-section through the tubular section. Other elliptical eccentricities may be used and stations having other than six sections may be formed within the scope of the present invention. That is, the features involved here, those of aerodynamic configuration at launching, and a closed station on repositioning, may be accomplished by selecting a tubular member of elliptical transverse cross-section whose cross-section along a plane angularly inclined to its longitudinal axis at 30°, 36° or 45° etc. is a circle and the corresponding station formed has 12, 10, or 8 etc. sides made up of tubular members or sections.

Having circular end portions at the interfaces allows one section to be rotated with respect to adjacent sections at each end thereof while maintaining contact over the entire periphery of each connection. A connection so formed will withstand internal pressure and tension or compression along the axis of the tubular section. Relative rotation between the mating end faces of the connection is accomplished by drive means such as that illustrated in FIGS. 4 and 5.

Upon reaching its orbital destination, the tubular sections of the space station are repositioned with respect to each other to form the desired wheel configuration, that is the six-sided station of FIG. 3. Repositioning is accomplished by rotating center sections 22 and 23 of each series in opposite directions while outer sections 10, 17 and 11, 18 of the respective series are restrained against rotation with respect to the center section corresponding thereto. When center sections 22 and 23 have each rotated through an angle of one hundred-eighty degrees, reorientation will have been completed and the station will have assumed the form shown in FIG. 3. During the rotation of the center sections 22, 23 in opposite directions, the angular relationship between the end faces of each center section 22, 23 and the opposed end faces of the respective outer sections 10, 17 and 11, 18 imparts pivoting movement to the outer sections 10, 11 of each series about the hinge 12 and to the outer sections 17, 18 of each series about the hinge 19, thereby moving the respective ends 15, 16 of the outer sections 10, 11 and the ends 32, 33 of the outer sections 17, 18 into mating engagement. When the ends 15, 16 and 32, 33 of the outer sections 10, 11 and 17, 18 have been respectively moved into mating engagement in the manner described, the locking elements 13, 14 and 20, 21 associated with the outer sections 10, 11 and 17, 18 automatically engage with each other to lock the outer sections 10, 11 and 17, 18 together to form respective joints capable of withstanding internal pressure and tension.

This completes the mechanical transformation from the stacked arrangement of the tubular sections into a hexagonal rim comprising the tubular sections. The space station in its repositioned form of a hexagonal rim may now be given a rotational velocity to provide an internal gravity and may be pressurized with air to form a habitable space structure.

The automatically erected space station of the invention is simple in construction, requires no exterior assistance in erection, and is ready for use as soon as erected.

A preferred embodiment of the invention has been specifically described and shown in the drawings by way of illustration but not as limitative of the scope of the invention, since various changes may be made in the described embodiment by those skilled in the art without departing from the scope of the invention as defined by appended claims.

I claim:

1. A space station for projection into space in a collapsed condition comprising tubular sections arranged in plural series, each series comprising a plurality of said tubular sections connected together in end to end relation, said plural series of tubular sections being disposed in side-by-side relationship and the outer tubular sections of each series being pivotally connected to the outer tubular sections of another series corresponding thereto to define the collapsed condition of the space station, and means operatively associated with said tubular sections for repositioning said tubular sections from the collapsed condition of the space station into a predetermined operative configuration.

2. A space station as set forth in claim 1, wherein said tubular sections are elliptical in transverse cross-section and have inclined end faces of circular cross-section.

3. A space station as set forth in claim 1, further including means on the outer tubular sections at the opposite ends of each series for locking corresponding outer tubular sections of adjoining series together in response to repositioning of said tubular sections from the collapsed condition of the space station into the predetermined operative configuration.

4. A space station as set forth in claim 1, wherein each series comprises at least three tubular sections including outer tubular sections at its opposite ends and at least one intermediate tubular section rotatably interconnected between said outer tubular sections in end to end relationship, and said repositioning means comprises drive means to impart rotation to said intermediate tubular sections in said plural series about their longitudinal axes.

5. A space station as set forth in claim 1, wherein said repositioning means comprises drive means mounted within selected tubular sections, driven means operated by actuation of said drive means to effect movement of said tubular sections from the collapsed condition of the space station into the predetermined operative configuration, and control means for stopping actuation of said drive means to discontinue operation of said driven means when the space station has been repositioned in its predetermined operative configuration.

6. A space station for projection into space in a collapsed condition comprising elongated tubular sections arranged in two series; each series comprising three interconnected tubular sections arranged longitudinally of each other and including outer tubular sections at the opposite ends of the series and a rotatable center tubular section between the outer tubular sections, said center tubular section having symmetrical inclined end faces angled with respect to the longitudinal axis of the series in opposite directions, said outer tubular sections of the series having symmetrical inclined end faces angled with respect to the longitudinal axis of the series in opposite directions, and the end faces of said center tubular section being complementary to the end faces of the adjoining outer tubular sections opposed thereto and in relatively rotatable mating relationship therewith; pivotable means joining the corresponding outer tubular sections of the two series to connect the two series in side-by-side relationship to define the collapsed condition of the space station, and drive means to impart rotation to said center tubular sections of the two series for repositioning said tubular sections from the collapsed condition of the space station into a hexagonal rim defining the operative condition of the space station.

References Cited

Astronautics Magazine, September 1962, pages 16 and 20.

JOHN E. MURTAGH, *Primary Examiner.*

RALPH D. BLAKESLEE, *Examiner.*